United States Patent [19]
Morrison

[11] Patent Number: 5,163,382
[45] Date of Patent: Nov. 17, 1992

[54] BIRD FEEDER APPARATUS

[76] Inventor: Richard D. Morrison, 221 Lake Williams Dr., Lebanon, Conn. 06249

[21] Appl. No.: 879,298

[22] Filed: May 7, 1992

[51] Int. Cl.$^5$ ............................................. A01K 5/00
[52] U.S. Cl. ................................................. 119/57.9
[58] Field of Search ............... 119/57.9, 57.8, 52.1, 119/52.2, 52.3

[56] References Cited

U.S. PATENT DOCUMENTS

| | | | |
|---|---|---|---|
| 2,856,898 | 10/1958 | Doubleday et al. | 119/57.9 |
| 4,259,927 | 4/1981 | Clarke | 119/52.3 X |
| 4,646,686 | 3/1987 | Furlani | 119/57.9 |
| 4,821,681 | 4/1989 | Tucker | 119/57.9 X |
| 4,846,111 | 7/1989 | Kilham | 119/57.9 |

Primary Examiner—Gene Mancene
Assistant Examiner—Thomas Price
Attorney, Agent, or Firm—Leon Gilden

[57] ABSTRACT

A bird feeder arranged to discourage squirrels from access to food within the feeder includes a first housing reciprocatingly receiving a second housing, with the first housing including side wall openings and the second housing including side wall openings aligned in a first position and displaced in a second position when a squirrel alights upon a top wall of the first housing projecting the second housing within the first housing preventing access of the squirrel to food components within the second housing.

3 Claims, 4 Drawing Sheets

BIRD FEEDER APPARATUS

BACKGROUND OF THE INVENTION

1. Field of the Invention

The field of invention relates to bird feeder apparatus, and more particularly pertains to a new and improved bird feeder apparatus wherein the same is arranged to prevent access to a squirrel relative to food components within the second housing of a plurality of housings.

2. Description of the Prior Art

Preventing access of a squirrel and other such animals to food components within a bird feeder structure is of consideration in the prior art as such squirrels tend to eliminate food from the intended recipients, such as the birds. The instant invention attempts to overcome deficiencies of the prior art by providing for an organization of compact and convenient construction preventing such access to the food component by a squirrel and other members of the rodent family.

Accordingly, there remains a need for a new and improved bird feeder apparatus as set forth by the instant invention addressing both the problems of ease of use as well as effectiveness in construction and in this respect, the present invention substantially fulfills this need.

SUMMARY OF THE INVENTION

In view of the foregoing disadvantages inherent in the known types of bird feeder apparatus now present in the prior art, the present invention provides a bird feeder apparatus wherein the same displaces a second housing relative to a first housing preventing access to food within the second housing. As such, the general purpose of the present invention, which will be described subsequently in greater detail, is to provide a new and improved bird feeder apparatus which has all the advantages of the prior art bird feeder apparatus and none of the disadvantages.

To attain this, the present invention provides a bird feeder arranged to discourage squirrels from access to food within the feeder including a first housing reciprocatingly receiving a second housing, with the first housing including side wall openings and the second housing including side wall openings aligned in a first position and displaced in a second position when a squirrel alights upon a top wall of the first housing projecting the second housing within the first housing preventing access of the squirrel to food components within the second housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bird feeder apparatus which has all the advantages of the prior art bird feeder apparatus and none of the disadvantages.

It is another object of the present invention to provide a new and improved bird feeder apparatus which may be easily and efficiently manufactured and marketed.

It is a further object of the present invention to provide a new and improved bird feeder apparatus which is of a durable and reliable construction.

An even further object of the present invention is to provide a new and improved bird feeder apparatus which is susceptible of a low cost of manufacture with regard to both materials and labor, and which accordingly is then susceptible of low prices of sale to the consuming public, thereby making such bird feeder apparatus economically available to the buying public.

Still yet another object of the present invention is to provide a new and improved bird feeder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
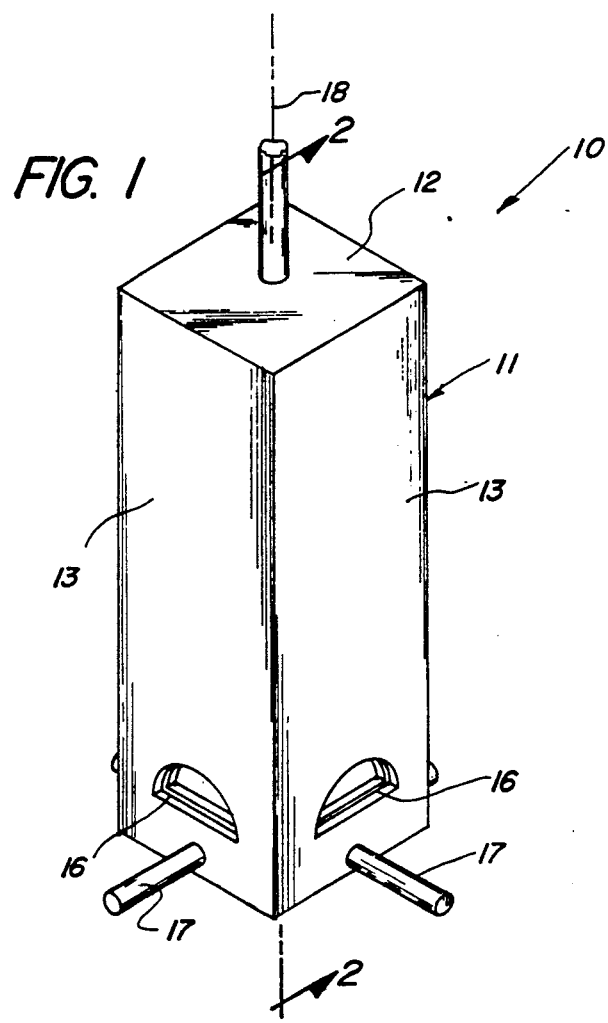
FIG. 1 is an isometric illustration of the instant invention.
Figure 2:
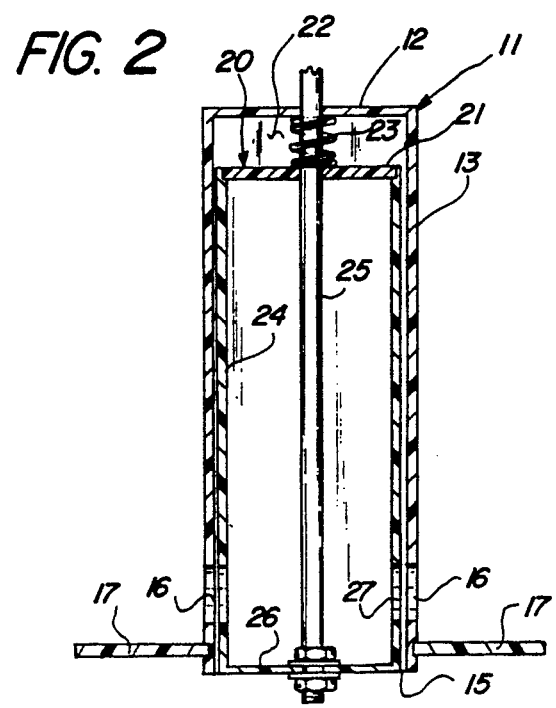
FIG. 2 is an orthographic view, taken along the lines 2—2 of FIG. 1 in the direction indicated by the arrows.
Figure 3:
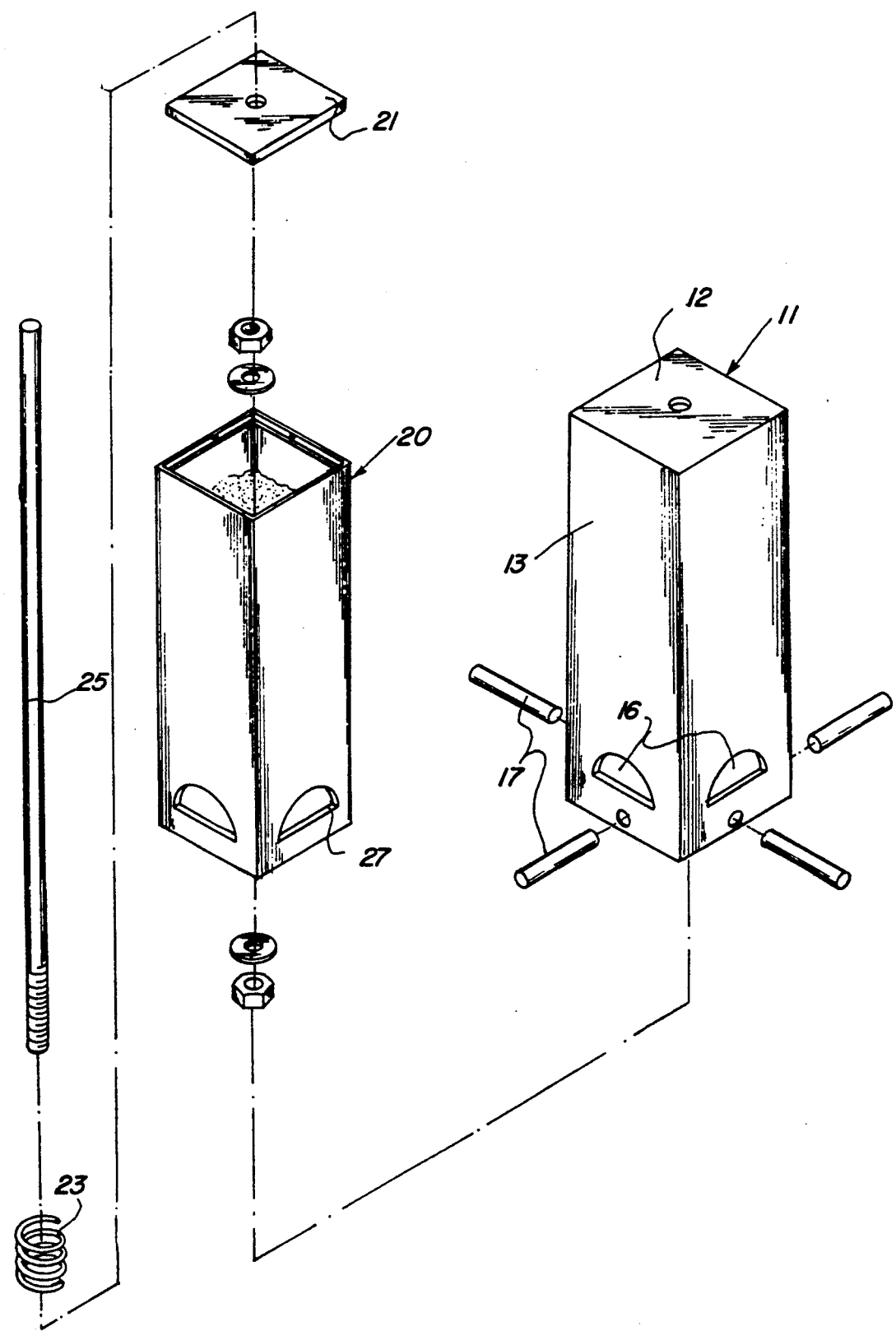
FIG. 3 is an isometric exploded view of the invention.

With reference now to the drawings, and in particular to FIGS. 1 to 7 thereof, a new and improved bird feeder apparatus embodying the principles and concepts of the present invention and generally designated by the reference numeral 10 will be described.

More specifically, the bird feeder apparatus 10 of the instant invention essentially comprises a first housing 11 of a predetermined height defined along the housing axis 18, including a first housing top wall 12 orthogonally oriented relative to first housing side walls 13. Each side wall of the first housing side walls 13 includes a first housing food access opening 16 directed through each first housing side wall 13 adjacent a lower distal end thereof, with a support rod 17 orthogonally oriented relative to each side wall positioned below a respective first housing food access opening 16. A first housing bottom wall entrance opening 15 directed through a lower distal end of the first housing between the side walls 13 permits positioning of a second housing 20 therewithin. The second housing 20 includes a second housing top wall lid 21 arranged in a parallel spaced relationship below the first housing top wall 12 defining a spring cavity 22 between the first housing top wall 12 and the second housing top wall lid 21. A spring member 23 is interposed between the first housing top wall 12 and the second housing top wall lid 21. Second housing side walls 24 are provided with one of said side walls 24 arranged parallel to a respective first housing side wall 13. A support rod 25 coaxially aligned with the axis 18 is fixedly mounted to the second housing floor 26 in an orthogonal relationship projecting coextensively through the second housing 21 and directed through the first housing top wall 12 orthogonally and medially thereof having a spring member 23 wound about the support rod 25 within the spring cavity 22. Second housing side wall openings 27 are aligned with and coextensive relative to the first housing opening 16 in a first position, with the second housing side wall openings 27 displaced relative to the first housing access opening 16 in a second position when a squirrel and the like is positioned upon the first housing top wall 12 to compress the spring 23 and displace the first housing relative to the second housing in a vertical orientation relative to one another. In this manner, access to food contained within the second housing 20 is not available to a squirrel when the squirrel is directed upon the first housing, as illustrated.

Figure 4:
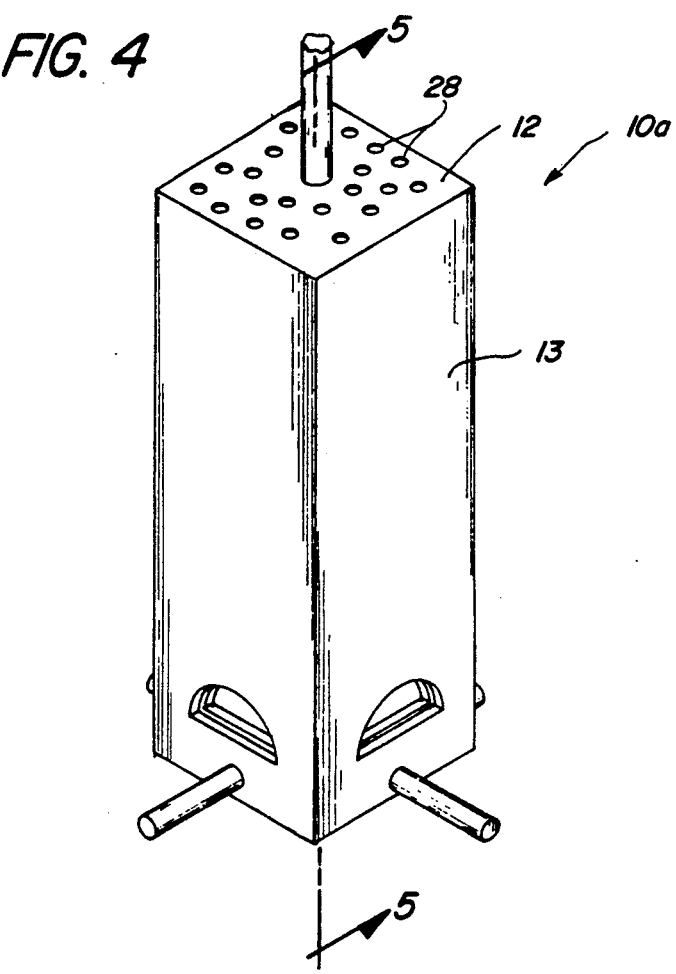
FIG. 4 is an isometric illustration of a modified first housing of the invention.
Figure 5:
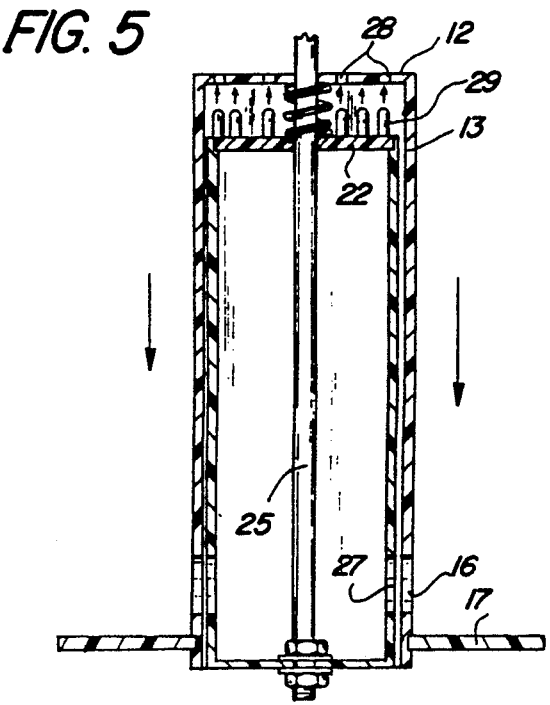
FIG. 5 is an orthographic view, taken along the lines 5—5 of FIG. 4 in the direction indicated by the arrows.
Figure 6:
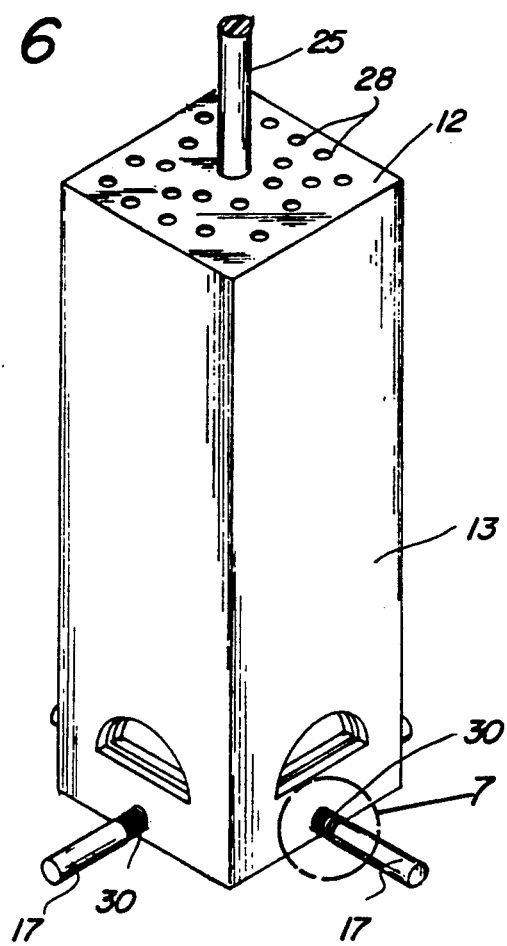
FIG. 6 is an isometric illustration of the support rods of the first housing spring mounted relative to the first housing.
Figure 7:
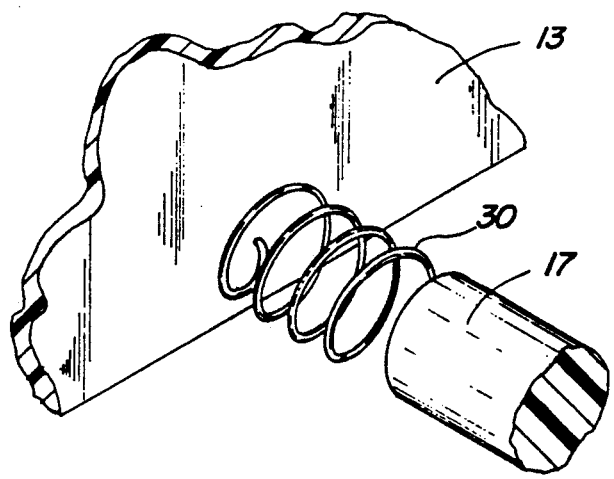
FIG. 7 is an enlarged isometric illustration of section 7, as set forth in FIG. 6.

The apparatus 10a, as illustrated in FIG. 4, further includes the second housing top wall 21 having a matrix of second housing top wall rods 29. The first housing top wall 12 includes a matrix of first housing top wall apertures 28 with one of the rods 29 coaxially aligned with one of the apertures 28 as the rods 29 are orthogonally mounted to the second housing top wall 21 and displaced from the first housing top wall 12 in the first position, but project through the first housing top wall 12 in a second position.

Further, the apparatus 10a is arranged to optionally include a support rod spring 30 interposed between each support rod 17 and a respective side wall 13 to normally maintain the support rod 17 in an orthogonal relationship relative to an associated side wall, but prevent accommodation of a squirrel and the like of greater weight than an associated predetermined member of a bird family, wherein the spring 30 will displace to prevent support of such a larger animal.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bird feeder apparatus, comprising,
   a first housing, the first housing including a first housing cavity, and a second housing reciprocatably mounted within the first housing cavity, the first housing and the second housing coaxially aligned about a predetermined axis, with the first housing including first housing side walls, the second housing including second housing side walls spaced from and parallel the first housing side walls in adjacency relative thereto, wherein the first housing side walls each include a first housing side wall opening and the second housing side walls each include a second housing side wall opening, with one of said first housing side wall openings aligned with one of said second housing side wall openings in a first position, and displaced vertically relative to the second housing side wall openings in a second position, and
   control means for biasing the first housing relative to the second housing in the first position,
   the first housing includes a first housing top wall, the second housing includes a second housing top wall lid removably mounted relative to an upper distal end of the second housing, with the second housing further including a second housing floor arranged parallel to and below the second housing top wall lid,
   the first housing top wall includes a matrix of apertures therethrough, and the second housing top wall lid includes a matrix of top wall rods, with one of said top wall rods coaxially aligned with one of said apertures, and the top wall rods spaced below the apertures in the first position and directed through the apertures in the second position.

2. An apparatus as set forth in claim 1 wherein the control means includes a support rod fixedly and orthogonally mounted medially of the second housing floor projecting coaxially along the predetermined axis through the second housing top wall lid, and the second housing top wall lid spaced below and parallel the first housing top wall to define a spring chamber therewithin, and a spring member interposed in surrounding relationship relative to the support rod between the first housing top wall and the second housing top wall lid.

3. An apparatus as set forth in claim 2 wherein each first housing side wall opening includes a support rod orthogonally mounted to each said first housing side wall below a respective first housing side wall opening, and a support rod spring interposed between each support rod and the first housing side wall to bias each support rod orthogonally relative to each first housing side wall.

* * * * *